Jan. 14, 1958 C. W. HOYT ET AL 2,820,092
TELEVISION RECEIVING SYSTEMS
Filed Nov. 30, 1950
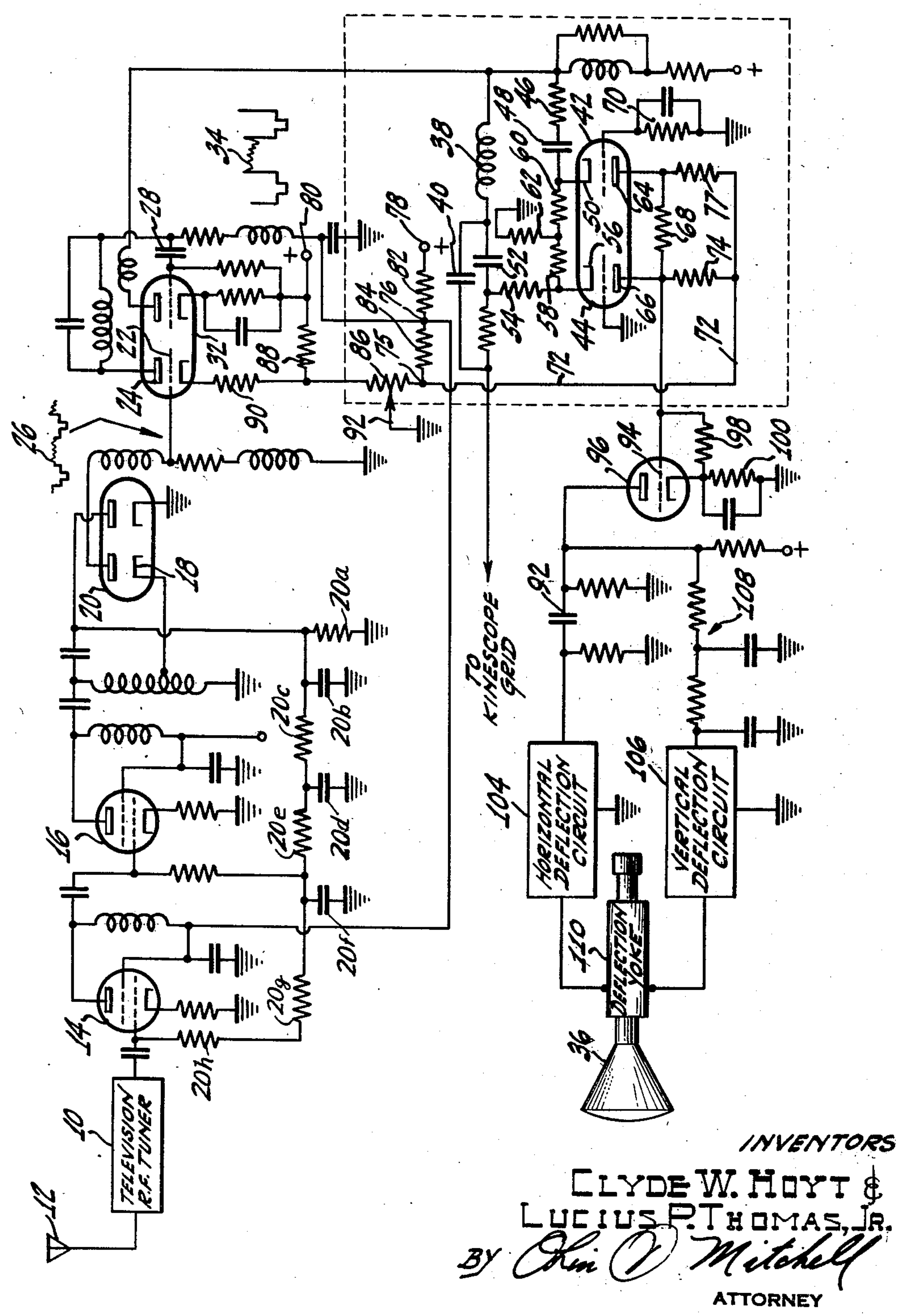
INVENTORS
CLYDE W. HOYT &
LUCIUS P. THOMAS, JR.
BY Olin V. Mitchell
ATTORNEY United States Patent Office 2,820,092

Patented Jan. 14, 1958

2,820,092

TELEVISION RECEIVING SYSTEMS

Clyde W. Hoyt, Pennsauken, and Lucius P. Thomas, Jr., Collingswood, N. J., assignors to Radio Corporation of America, a corporation of Delaware Application November 30, 1950, Serial No. 198,372

2 Claims. (Cl. 178—7.3)

The present invention relates to improvements in radio receiving systems of the type adapted to receive and demodulate composite intelligence signals having a synchronizing component represented by high amplitude variations with lower amplitude variations representing another type of information and relates more directly, although not necessarily exclusively, to radio receivers adapted to receive and demodulate television signals of the type now utilized in commercial television broadcasting.

In more particularity, the present invention relates to improvements in circuit techniques and processing of standard broadcast television signals so as to improve the precision with which the synchronizing component and the video component of these signals are separated.

The present invention further relates to improvements of television signal receiving circuits which will allow a greater dynamic range of television signal amplitudes and brightness changes to be successfully received and reproduced.

Perhaps nowhere in the electronic art is the demand greater for precision signal processing at low costs than in the manufacture of television receivers. As is well-known by those skilled in the art the present day standard television signal comprises two main portions which are distinguishable from one another by both waveform and amplitude.

These portions are usually called the synchronizing component and the video component. It is the purpose of the synchronizing component to maintain synchronism between the television transmitter image scanning device and the television receiver signal reproducing device so that the picture elements defined by the transmitter will be properly positioned in the television receiver picture raster. The video component, representing lower amplitude variations, of course represents the brightness of each element in the picture as scanning at the transmitter and reproduction at the receiver takes place.

In order to prevent interference between the video component and the synchronizing component at the receiver it is necessary, in the processing of the television signal to separate these components one from the other. This is most commonly done on an amplitude basis. Synchronizing information being pulse like in form generally represents 100 percent modulation of the television carrier while peak video information seldom rises above 75 percent modulation of the television carrier. The basic system of amplitude separation of the synchronizing component of the television signal is beset by a number of problems when subjected to variations in the amplitude of the signal as received by the receiver, these variations being caused by interference, fading, etc.

In order to minimize the effects of signal fading on synchronizing signal separation in television receivers, as well as the visual effects of fading on the reproduced image, automatic gain control circuits are now in wide use. These circuits generally sample the amplitude of the demodulated television signal and control the gain of the receiver in a manner which is inversely proportional to the increase or decrease of the demodulated signal above or below a predetermined standard. However, unless considerable expense is tolerated these automatic gain control circuits are not perfect in their action, especially under conditions of extremely low signal strengths and extremely high signal strengths. The basic amplitude discriminatory or threshold device used as a synchronizing signal separator although being supplied with the AGC regulated signal will tend, with the imperfect action of the AGC circuit, to provide insufficient sync at low level signals (along with excessive noise) while producing too deep a signal separation at high level signals thereby tending to include some video information along with the separated sync.

Another disadvantageous effect frequently found in modern day television receivers is that of poor sync separation due to variations in the contrast range which the television receiver is adjusted to produce by different viewers. This of course assumes that sync separation by an amplitude discriminatory or threshold device is accomplished at a point in the receiver subsequent to the contrast control. Indeed it is common practice in the television art to accomplish sync separation at the output of the last video amplifier in the television receiver. Thus, in addition to sync separation varying in accordance with the intensity of the received television signal, sync separation will also be a function of the setting of the receiver contrast control.

Finally, if, as in most cases, it is desirable to pass the separated sync through a noise clean up gate which removes substantially all noise appearing above the peak of the separated sync, it will be seen that the effectiveness of such noise clean up will also be rendered a function of contrast control setting as well as received signal level.

It is therefore a purpose of the present invention to provide an improved synchronizing signal separator circuit for television receivers which will minimize the effects of signal strength variations on the nature of the synchronizing signal separated.

It is a further object of the present invention to provide an improved synchronizing signal separator circuit for use in television receivers at a position in the receiver circuit subsequent to the contrast control means and being so constructed as to minimize the effects of changes in picture contrast on the nature of the synchronizing signal separated.

It is further an object of the present invention to provide a novel control circuit for television receivers which employ both a threshold type sync separating circuit positioned at a point in the receiver subsequent to the television receiver contrast control means and a sync noise clipping means following the separator circuit, the novel control circuit acting to maintain substantially constant the sync separating action as well as noise limiting action regardless of signal strength and contrast control settings.

In the realization of the above objects and features of advantage the present invention in one of its more general forms contemplates the use of a television sync separator circuit having a controllable threshold which permits the amplitude level below which the separator circuit will not pass signals to be varied in accordance with a control signal. A control signal is then developed which varies as a joint function of the television signal amplitude received by the receiver and the gain setting of the video amplifier of the television receiver.

The present invention further contemplates the use of a threshold type noise clipping amplifier connected in cascade with the output of the sync separator circuit. The noise clipping threshold of the sync amplifier is also made controllable as a function of the above mentioned control voltage. Thus in one of the more elaborate forms of the present invention the sync separator clipping threshold of the sync separator and the noise clipping threshold of the syn amplifier following the sync separator are made a function of both the received signal intensity and the gain of the video amplifier of the television receiver.

Although the present invention is in no way limited to a particular form of threshold type sync separator circuit it is particularly advantageous to employ a sync separator circuit which not only has a controllable threshold but provides separate amplitude discriminatory channels for the horizontal and vertical sync components of the synchronizing signal.

It is therefore another object of the present invention to provide a new and useful dual channel television synchronizing signal separator circuit having a controllable sync separation threshold and which when used with the above described control circuit of the present invention provides improved synchronizing signal separation action.

A more complete understanding of the present invention as well as a fuller appreciation of its objects and features of advantage will be discerned through a reading of the following description especially when taken in connection with the accompanying drawing in which the single figure shows a combination block and schematic representation of one embodiment of the present invention as applied to an exemplary television receiver arrangement.

Turning now to the drawing there is shown at 10 an R. F. tuner adapted to receive radio frequency signals from the antenna 12. The R. F. tuner 10 may include conventional superheterodyne circuits well known in the art as shown, for example, in an article entitled "Television receivers" appearing in the RCA Review by Anthony R. Wright. The R. F. tuner is of course followed by I. F. amplifiers 14 and 16. The output of I. F. amplifier 16 is coupled to the cathode 18 of the detector diode 20 which produces demodulated video signals having a D. C. picture background (or brilliance) component present. This video signal is coupled to the grid 22 of the first video amplifier 24. The demodulated video signal is illustrated at 26. The output of the video amplifier 24 is capacitively coupled by capacitor 28 to the grid 30 of the second video amplifier 32. The video signal 34 appearing at the output of the video amplifier 32 is suitably coupled to the control grid of the kinescope 36 through the inductance 38 and capacitor 40.

The video signal 34 is also coupled to the respective vertical and horizontal sync pre-separators 42 and 44. The video signal to the vertical pre-separator 42, is applied through resistor 46 and capacitor 48 to the cathode 50. For ease in further description the vertical and horizontal sync pre-separator will be referred to by the term "separator" or "sync separator." The video signal 34 is also applied, via capacitor 52 and resistor 54, to the cathode 56 of the horizontal sync separator 44. Cathodes 50 and 56 are connected through input resistors 58 and 60 which have their junction connected to ground through a stabilizing input resistor 62. The anode 64 and 66 of the vertical and horizontal sync separators are connected by means of resistor 68. The grid of the vertical sync separator is connected with ground with the time constant circuit 70 whose function forms no part of the present invention. This circuit device which increases the cathode input impedance of the vertical separator and hence increases the signal output of the vertical separator tube is disclosed and claimed in copending U. S. patent application Ser. No. 198,371, filed November 30, 1950, by Clyde W. Hoyt and Lucius P. Thomas, entitled "Television Receiving Systems."

According to the present invention the +B power for the anodes 66 and 64 of the sync separator tubes is supplied from bus 72. The anode 64 is connected to the bus 72 through a resistance 77 while the anode 66 is connected to the bus through a suitable resistor 74. The bus 72 is in turn connected to a point 75 on a D. C. voltage divider connected between the two +B terminals 78 and 80. This voltage divider includes resistors 82, 84, 86 and 88. The terminal 78 is preferably somewhat positive with respect to the terminal 80.

In further accordance with the present invention the current demands of at least one video I. F. amplifier stage in the receiver is supplied from a tap along this voltage divider. The connection from the anode supply circuit of tube 14 to the tap 76 illustrates such an arrangement. The cathode of the first video amplifier 24 is also connected to the upper terminal of resistor 86 through resistor 90. The tap 92 on the potentiometer resistor 86 is then grounded so that movement of the tap 92 is effective to control the gain of the video amplifier 24 by imposing various degrees of degeneration in the cathode circuit of this amplifier. Since both of the +B power supply terminals 78 and 80 are referenced with respect to ground as a datum potential, the grounded tap 92 may be considered to effectively separate the above described voltage dividing system into two bleeder sections. The first section exists between terminal 78 and tap 92 and the second section exists between terminal 80 and tap 92. As will be seen hereinafter the relative potential of terminals 78 and 80 with respect to ground or to each other is not too important, however, as noted above it is sometimes preferable with the circuit arrangement shown to have terminal 78 more positive with respect to ground than terminal 80.

In further accordance with the present invention the output of the anode 66 of the horizontal sync separator is direct current coupled with the grid 94 of the sync amplifier 96. The grid bias for the amplifier 96 thus is obtained across the resistor 98 which forms a part of a D. C. bleeder between the anode 66 of tube 44 and ground. The other part of this bleeder is the cathode resistor 100 of tube 96.

In accordance with the conventional prior art practice the output of the sync amplifier 96 is then appropriately coupled to a differentiating network 102 to some form of horizontal deflection circuit 104 while the sync input to the vertical deflection circuit 106 is supplied through an integrating network 108. The outputs of the horizontal and vertical deflection circuits are coupled to some form of deflection means such as yoke 110 which accomplishes electromagnetic deflection of the electron beam within the kinescope 36.

Before considering in detail how the regulatory action of the present invention is achieved it is well to consider the general principles governing the sync separation circuit shown in the drawing. As pointed out hereinabove the regulatory action of the present invention is not limited to any particular type of synchronizing signal separator. The only requirement is that the synchronizing separator used in connection with the present invention be provided with some means for varying the sync separation threshold in accordance with electrical signal information. In another manner of speaking the synchronizing signal separator employed for use with the present invention must be of a type which has variable acceptance so that it will accept for passage only a certain amplitude range of input signal, this amplitude range being controllable in accordance with some form of control signal.

The novel synchronizing signal generator shown in the figure based upon tubes 42 and 44 operates substantially as follows: The sync negative video signal 34 is coupled to the cathodes 50 and 56 of the triodes 42 and 44 by means of the capacitors 48 and 52. Since the grids of the triodes 42 and 44 are connected with ground it is evident that any negative swing of the cathodes 50 and 56 will cause grid current conduction in the triodes. This will tend to set a postive potential on the cathodes of the respective triodes which represents the negative peak of sync as applied to the cathodes. Capacitor 52 is made small compared to capacitor 48. Capacitor 52 is selected so that the triode 44 is supplied in the most part with frequencies corresponding to the television line rate. Thus the bias on the cathode 56 will be mostly determined by horizontal synchronizing information. The cathode input impedance of the triode 44 will be so low that the capacitor 52 will not be of sufficiently low reactance to develop much vertical synchronizing signal at the cathode 56. On the other hand capacitor 48 is made considerably larger so as to develop vertical synchronizing information at the cathode 50 of the triode 42. The time constant circuit 70 associated with the grid of the triode 42 increases the cathode impedance of the triode 42 for low frequencies and the positive cathode potential therefor. The voltage developed at the cathode 50 will be to a very large extent attributable to vertical synchronizing information. The resistor 62, common to both cathodes, of course allows the potential on one cathode to partially influence the potential on the other cathode so that a certain amount of counter action is obtained. This is found to enhance noise immunity. The output of the triode 42 appearing at the anode 64 is coupled to the anode 66 of triode 44 through resistance 68. Any capacitance to ground from the anode 66 will tend, if resistor 68 is made large enough, to filter out any high frequency (horizontal sync) variations developed by the triode 42. Thus there will occur at the junction of resistor 68 and 74 a virtual mixing of separated vertical and horizontal sync, the vertical sync substantially coming from triode 42 while the horizontal sync substantially is coming from the triode 44. By varying the anode voltage applied to the anodes 66 and 64 it can be seen that the cut-off voltage on the triodes may be controlled and thus the acceptance of the triodes as sync separators may be controlled. Hence lowering the anode voltage will make the cut-off voltage of the triodes more positive and hence reduce the acceptance of the triodes. Raising the anode voltage of the triodes will make more negative the required grid to cathode voltage for cut-off conditions and hence will increase the acceptance of the triodes. In other words lowering the anode voltage of the triodes shifts the conduction threshold of the sync separator more negatively while a decrease in anode voltage has the opposite result.

The above described novel structure of the present invention which provides the connection of the bus 72 to the tap 75 between resistors 84 and 86 and the related connection of the resistors 82 and 84 to the contrast control potentiometer 86 further taken in connection with the supply through resistor 82 of anode current requirements for at least one video amplifier, operates substantially as follows.

Should the contrast control of the television receiver be positioned to provide more degeneration and consequently less video amplifier gain, thus to reduce the contrast of the picture, the peak to peak video signal applied to the sync separator circuit will be reduced. To obtain this additional degeneration the tap 92 of potentiometer 86 must have been lowered and hence will increase the current flow through the bleeder system comprising resistors 82, 84 and a part of resistor 86. This will of course reduce the potential applied to the control bus 72 and lower the anode voltage applied to sync separator circuit. As described above this will lower the acceptance of the sync separator stage and will act in a direction to maintain at a constant percentage of the video signal the signal information clipped by the sync separator stage. Thus the output of the clipper will still represent only signal synchronizing information and not be contaminated by video signals. Should a greater contrast in the scene being reproduced be desired, the contrast control will have its tap 92 raised to reduce degeneration and increase the video amplifier gain. This will decrease current flow through the above described voltage divider system and hence make the control bus 72 more positive. This will increase the acceptance of sync separator to afford optimum sync separation and maximum drive to sync amplifier 96.

It is desirable that the sync amplifier 96 be adjusted so that the tips of sync applied thereto reach substantially the cut off of the tube. This acts to clip noise appearing on top of sync. Thus if the contrast control is positioned for a lower contrast scene the negative grid to cathode voltage of the tube 96 should be increased so that peaks of separated sync will still drive the sync amplifier 96 to cut off and thus exclude noise peaks riding on top of sync from the output of the sync amplifier. This action in accordance with the present invention is obtained through the direct connection of the grid 94 with the anode 66 of the sync separator. With reduced contrast adjustment of the contrast control the bus voltage described above will become more negative and thus increase the negative voltage in the sync amplifier 96 as desired. An increase in contrast through adjustment of the contrast control will of course have the opposite desirable effect.

In further accordance with the operation of the present invention, assuming a constant setting of the constant control, consider the compensation provided upon the reduction of average signal strength to the receiver. Under these conditions assuming the presence of an automatic control circuit such as, for example, afforded by the diode 20 and elements 20*a*, 20*b*, 20*c*, 20*d*, 20*e*, 20*f*, 20*g*, and 20*h* of the drawing, the average current of the video I. F. amplifier 14 will increase. This is of course due to the positive increase in bias applied to the I. F. amplifier 14 by the AGC system. The resulting increase in current through resistor 82 will reduce the positive voltage applied to the control bus 72 and thus lower the acceptance of the sync separator circuit. The corresponding desired reduction of the negative grid potential of the sync amplifier 96 will follow. Finally should the average signal strength received by the television receiver increase, the AGC system will reduce the average current flow to the I. F. amplifier 14 and thus allow the control bus 72 to become more positive. This will increase the acceptance of the sync separator circuit as is desired and will also make the grid potential on the sync amplifier 96 more positive.

From the above it is clear that the applicant has provided a novel synchronizing separator circuit and control system whereby synchronizing signal separation from television signals is rendered much more reliable than in some prior art systems. This results in improved stability in the deflection circuits of the television receiver. It is clear from the above that the broad features of the applicant's invention are in no way limited to the specific diagram shown in the drawing. Other suitable sync separator circuits which may be controlled by the control voltage are abundant in the art although in most instances not quite as satisfactory as the arrangement shown in the drawing. An example of a suitable alternative sync separator is shown in the above referenced article appearing in the RCA Review by Anthony R. Wright. It is further seen that many ways could be arranged for controlling the threshold of the synchronizing signal separator in accordance with the gain of the video amplifier. For example, one alternative way would be to provide a separate voltage divider system ganged to the contrast control of the receiver. Furthermore, the control of the threshold of the sync separator circuit may be directly governed by automatic gain control information rather than the plate current of one of the video I. F. amplifier stages. If desired a separate signal strength detecting circuit could be provided specifically for this purpose. On the whole however, one of the most economical ways of carrying out all of the aspects of the present invention is as shown in the drawing.

It is finally to be understood that although the preferred circuit shown in the drawing provides the simultaneous control of the sync separator acceptance as well as the sync amplifier gain setting, general improvements in television set performance may be realized by omitting one or more of these functions. For example it is found that the control of the sync amplifier bias by signal strength information and video amplifier gain may be omitted, at of course the expense of some noise immunity. Correspondingly, the variation of the synchronizing separator acceptance or threshold with signal strength variations may be omitted to allow the exclusive control of sync separator acceptance by video amplifier gain or contrast control position. Other combinations of the various novel aspects disclosed in the present invention will, of course, occur to those skilled in the art after having benefited from the above teachings.

Having thus described our invention what we claim is:

1. A synchronizing signal separator circuit comprising in combination, a source of signals of varying strength a voltage datum terminal, an input terminal coupled to said source of signals, an output terminal and a control terminal, a first and second electron discharge tube each having at least an anode a cathode and control electrode, a first resistance connected between the cathodes of said first and second discharge tubes, a second resistance connected from a point along said first resistance to said voltage datum terminal, a third resistance connected between the anodes of said first and second discharge tubes, a fourth and fifth resistance respectively connected between the anodes of said first and second discharge tubes and said control terminal, a direct connection from said first discharge tube control electrode and said voltage datum, a time constant circuit comprising the parallel combination of a resistance and capacitance connected between the control electrode of said second discharge and said voltage datum, an inductance and first capacitance connected in series between said input terminal and said first discharge tube cathode, a sixth resistance connected in series with a second capacitor connected between said input terminal and said second discharge tube cathode, and means for varying the potential of said control terminal relative to said datum.

2. Apparatus according to claim 1 wherein there is additionally provided third electron discharge tubes having at least an anode cathode and control electrode, a direct current connection from said first discharge tube anode to said third discharge tube control electrode, a resistance connected from said third discharge tube cathode to said voltage datum terminal, whereby the control electrode cathode potential of said third discharge tube is made to vary directly with the average potential of said first discharge tube anode.

References Cited in the file of this patent

UNITED STATES PATENTS

| | | |
|---|---|---|
| 2,227,056 | Blumlein | Dec. 31, 1940 |
| 2,240,490 | Cawein | May 6, 1941 |
| 2,356,141 | Applegarth | Aug. 22, 1944 |
| 2,398,596 | Prince | Apr. 16, 1946 |
| 2,481,045 | Schroeder | Sept. 6, 1949 |
| 2,492,943 | White | Dec. 27, 1949 |
| 2,550,960 | Brabham | May 1, 1951 |
| 2,555,533 | Dean | June 5, 1951 |
| 2,606,247 | Fyler | Aug. 5, 1952 |

OTHER REFERENCES

Rider's Television Manual, vol. 1, Certified Radio Labs TV, pages 1–13, 14, Model 48–10 (copyright June 1948).

Radio and Television Retailing, December 1949, page 57.